United States Patent
Kumar et al.

(10) Patent No.: US 11,980,187 B2
(45) Date of Patent: May 14, 2024

(54) HERBICIDAL COMBINATIONS

(71) Applicant: UPL LTD, Haldia (IN)

(72) Inventors: Ajit Kumar, Mumbai (IN); Jaidev Rajnikant Shroff, Dubai (AE); Vikram Rajnikant Shroff, Dubai (AE)

(73) Assignee: UPL LTD, Haldia (IN)

( * ) Notice: Subject to any disclaimer, the term of this patent is extended or adjusted under 35 U.S.C. 154(b) by 169 days.

(21) Appl. No.: 16/767,220

(22) PCT Filed: Nov. 27, 2018

(86) PCT No.: PCT/IB2018/059338
§ 371 (c)(1),
(2) Date: May 27, 2020

(87) PCT Pub. No.: WO2019/106527
PCT Pub. Date: Jun. 6, 2019

(65) Prior Publication Data
US 2020/0404917 A1    Dec. 31, 2020

(30) Foreign Application Priority Data
Nov. 28, 2017   (IN) .............................. 201731042642

(51) Int. Cl.
A01N 43/54    (2006.01)
A01N 55/02    (2006.01)
A01N 57/20    (2006.01)

(52) U.S. Cl.
CPC ............. *A01N 43/54* (2013.01); *A01N 55/02* (2013.01); *A01N 57/20* (2013.01)

(58) Field of Classification Search
CPC ........ A01N 43/54; A01N 55/02; A01N 57/20; A01N 57/04; A01N 59/22; A01N 2300/00
See application file for complete search history.

(56) References Cited

U.S. PATENT DOCUMENTS

| | | |
|---|---|---|
| 9,307,765 B2 | 4/2016 | Shroff et al. |
| 2011/0212837 A1 | 9/2011 | Angermann et al. |
| 2013/0244876 A1 | 9/2013 | Jabs et al. |
| 2014/0274717 A1 | 9/2014 | Shroff et al. |
| 2020/0396998 A1 | 12/2020 | Kumar et al. |
| 2021/0360922 A1 | 11/2021 | Kumar et al. |

FOREIGN PATENT DOCUMENTS

| | | |
|---|---|---|
| CN | 106234401 A | 12/2016 |
| EP | 2777397 A1 | 9/2014 |
| JP | 201688913 A | 5/2016 |
| WO | 2009141367 A2 | 11/2009 |
| WO | 2011104213 A2 | 9/2011 |
| WO | 2016113334 A1 | 7/2016 |
| WO | 2016115709 A1 | 7/2016 |
| WO | 2017009061 A1 | 1/2017 |
| WO | 2017009138 A1 | 1/2017 |

OTHER PUBLICATIONS

Kroger et al., MSMA Antagonizes Glyphosate and Glufosinate Efficacy on Broadleaf and Grass Weeds, 2007, Weed Technology, 21 :159-165. (Year: 2007).*
Burke et al., Purple and Yellow Nutsedge (*Cyperus rotundus* and *C. esculentus*) Response to Postemergence Herbicides in Cotton, 2008, Weed Technology, 22:615-621. (Year: 2008).*
International Search Report and Written Opinion for International Application PCT/IB2018/059341; International Filing Date: Nov. 27, 2018; dated Jan. 31, 2019; 8 pages.
International Search Report and Written Opinion for International Application PCT/IB2018/059343; International Filing Date: Nov. 27, 2018; dated Feb. 11, 2019; 10 pages.
International Search Report and Written Opinion for International Application PCT/IB2018/059338; International Filing Date: Nov. 27, 2018; dated Jan. 30, 2019; 10 pages.
Caldiz, D. et al.; "Management of Grass and Broadleaf Weeds in Processing Potatoes (*Solanum tuberosum* L.) with Clomazone, in the Argentinian Pampas"; American Journal of Plant Sciences, vol. 7; 2016; pp. 2339-2348; DOI: http://dx.doi.org/10.4236/ajps.2016.716205.
Ferreira, L.R et al.; "Weed control on direct seeded tomato (*Lycopersicon esculentum* Mill.)"; Planta Daninha, vol. , Issue No. ; 1982; pp. 20-28.
Langton, S. et al.; "Efficacy of Clomazone Applied at Various Timings in Soybean (*Glycine max*)"; Weed Technology, vol. 11; 1997; pp. 105-109.
Moretti et al.; "Performance of Pre-emergence Herbicides in Almond Orchards"; University of California Agriculture & Natural Resources; 2012, 3 pages.
Rios, S.I. et al.; "Tolerance of Amaranthus palmeri populations from California to postemergence herbicides at various growth stages"; Crop Protection, vol. 87; 2016; pp. 6-12.
Sabbag, R. et al.; "Initial growth of sugarcane seedlings submitted to herbicides application": Revista Brasileira de Herbicidas, vol. 16, Issue No. 1; 2017; pp. 38-49.
Salzman, F. et al.; "Absorption, Translocation, Translocation, and Metabolism of Clomazone, Metribuzin and Linuron in Soybean (*Glycine max*) and Common Cocklebur (*Xanthium strumarium*)"; Weed Science vol. 40; 1992; pp. 395-401.
Valchev, N. et al.; "Combined application of different soil herbicides with seedlingless tomatoes" Rastienevadni Nauki (Plant Science), vol. 32, Issue No. 7-8; 1995; pp. 69-72.
Valchev, N.; "Selectivity of herbicides for average-early tomatoes" Rastenievadni Nauki (Plant Science), vol. 27, Issue No. 5; 1990; pp. 92-96.
Velev, et al., "On the use of the Napropamide herbicide in direct—sown tomatoes", National Union of Agricultural Industry, Horticulture and Viticulture Science, vol. XVI, No. 5-6, Sofia, 1979, 7 pages.
Westberg, D. et al.; "Weed Control with Clomazone Alone and with Other Herbicides"; Weed Technology, vol. 3; 1989; pp. 678-685.
Herbicide Classification, Take Action Herbicide-Resistance Management, 1 page.

(Continued)

*Primary Examiner* — Trevor Love
(74) *Attorney, Agent, or Firm* — CANTOR COLBURN LLP

(57) ABSTRACT

A herbicidal combination comprising (a) saflufenacil; (b) an organophosphorus herbicide; and (c) an arsenical herbicide; a composition comprising the same and a method of use thereof is described.

6 Claims, No Drawings

(56) References Cited

OTHER PUBLICATIONS

Jitendra et al. "Effect of atrazine, metribuzin, sulfosulfuron and tralkoxydim on weeds and yield of wheat (*Triticum aestivum*)", Indian Journal of Agronomy, vol. 47, Issue 1, pp. 72-76 (Year: 2002).

\* cited by examiner

HERBICIDAL COMBINATIONS

CROSS REFERENCE TO RELATED APPLICATIONS

This application is a National Stage application of PCT/IB2018/059338, filed Nov. 27, 2018, which claims the benefit of Indian Application No. 201731042642, filed Nov. 28, 2017, both of which are incorporated by reference in their entirety herein.

TECHNICAL FIELD

The present invention relates to a herbicidal combination for controlling undesirable plants. The present invention more specifically relates to a synergistic combination of herbicides for controlling weeds.

BACKGROUND AND PRIOR ART

Weeds are undesirable plants that can severely damage yield in crops. Farmers usually control these plants at the pre-plant stage as well as after sowing. Modern herbicides are used to either control or suppress these undesirable plants so as to allow sown crops a greater share of nutrient.

Current practices include combining herbicides with varied modes of action, which allows for broader spectrum of control and resistance management. However, the combinations currently known are not sufficient to control the resistant and persistent weeds. Growers, increasingly face complex weed situations that may not be controlled with just one herbicide. There is always a need in the art for improved herbicidal combinations with enhanced weed control efficacy.

PPO inhibitor herbicides are mostly used to injure broadleaf plants and have some activity on grasses. They have a limited translocation in plants and are used to control weeds in field crops, vegetables, tree fruits and vines, small fruits, nurseries, lawns, etc. PPO inhibitors usually burn plant tissues within hours or days of exposure, making them an excellent tool to control unwanted weeds both pre and post emergent.

Saflufenacil is PPO inhibitor herbicide that is used for both pre-plant burndown as well as post emergent control of weeds. Combination of Saflufenacil with other broad spectrum herbicides are known from WO2016113334 (Massa et. al) or US2013244876 (Thorsten et. al). Massa et al teach a combination comprising saflufenacil, glufosinate and a third herbicide selected from metribuzin, S-metolachlor, flumioxazin, clodinafop or clethodim. Thorsten et al teach a combination comprising saflufenacil and ethephon or cyclanilide.

Application of glutamine synthetase inhibitor herbicide Glufosinate results in a buildup of ammonia in the thylakoid lumen, leading to the uncoupling of photophosphorylation, which causes the production of reactive oxygen species, lipid peroxidation, and membrane destruction. Absorbed by the foliage of the plant, Glufosinate is an excellent tool for resistance management. It is mainly used for post-emergent control of weeds and grass weeds. Glufosinate combinations with saflufenacil is known from several prior art including WO2009/141367 teaches combinations of glufosinate, saflufenacil and pyroxasulfone and may optionally also combine one or more further herbicides selected from imidazolinones, triazolopyrimidines, pendimethalin, dicamba, atrazine, clomazone, flumioxazin, metazachlor and sulfentrazone. WO2011/104213A2 teaches combinations of glufosinate or glyphosate in combination with saflufenacil and optionally a third herbicide.

Monosodium methanearsonate (MSMA) is an organic arsenic herbicide. It is a selective contact herbicide for use in control of broadleaf and grasses. It is said to be less toxic as compared to inorganic arsenic herbicides. Koger et. al, have studied interactions between Glufosinate and MSMA and found that they are antagonistic to each other (MSMA Antagonizes Glyphosate and Glufosinate Efficacy on Broadleaf and Grass Weeds, Weed Technology 21(1):159-165. 2007).

Combinations of herbicides are used to control a broader range of weeds. However, the combination of herbicides may not always result in the desired effect. Combination of herbicides may lead to an additive effect or an antagonistic effect. It may also result in phytotoxicity to the crops making it an undesirable combination. Agronomists must therefore, carefully select the herbicides that can be combined to offer a synergistic effect that would control weeds while having no phytotoxic effect on the crop, and reduce the chances of development of herbicide resistant weeds.

Protection of planted crops from undesirable plants which inhibit crop growth is a perpetual struggle for all farmers. Herbicides have been used to control growth of such plants. There are many herbicides and combinations known in the art. There still remains a need for improved herbicidal combinations that can effectively control weeds thereby improving yield and plant health, with reduced phytotoxicity.

Saflufenacil is a PPO inhibitor herbicide. Its chemical name is N'-{2-chloro-4-fluoro-5-[1,2,3,6-tetrahydro-3-methyl-2,6-dioxo-4-(trifluoromethyl)pyrimidin-1-yl]benzoyl}-N-isopropyl-N-methylsulfamide and has the structure:

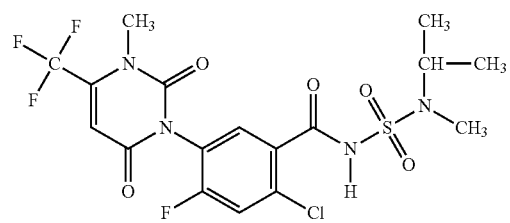 [SMILES: CC(C)N(C)S(=O)(=O)NC(=O)c1cc(-n2c(=O)cc(C(F)(F)F)n(C)c2=O)c(F)cc1Cl]

Glufosinate is a Glutamine synthetase inhibitor herbicide. Its chemical name is (2RS)-2-amino-4-[hydroxy(methyl)phosphinoyl]butyric acid and has the chemical structure:

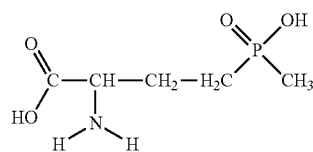

MSMA is an organometallic herbicide. Its chemical name is sodium hydrogen methylarsonate, and has the structure:

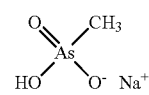

Saflufenacil alone is usually effective for control of early season broadleaf weed control. However, its weed control efficacy reduced beyond 30 days after treatment. Its efficacy did not change when saflufenacil and glufosinate were compared to glufosinate alone, showing that this combination still did not give the desired weed control and the combination with glufosinate under performed as compared to glufosinate pendimethalin. (Moretti et. al Performance of Pre-emergence Herbicides in Almond Orchards). There is therefore, a need in the art, for an herbicidal combination which offers a broader spectrum of weed control, which can give a better control of weeds at lower use rates, and which gives good residual control.

There is therefore a need in the art for combinations that have advantageous properties such as a herbicidal combination that is synergistic, helps in resistance management, reduces dosage of herbicides used thus causing minimal damage to the environment, a herbicidal combination that has excellent residual effects.

Embodiments of the present invention may therefore ameliorate one or more of the above mentioned problems:

OBJECTS OF THE INVENTION

Therefore, one object of the present invention is to provide a synergistic herbicidal combination.

Another object of the present invention is to provide a method of controlling weeds at a locus by application of a synergistic herbicidal combination.

Another object of the present invention is to provide a composition comprising a synergistic herbicidal combination.

Yet another object of the present invention is to provide a method of increasing yield in a crop by application of a synergistic herbicidal combination.

Another object of the present invention is to provide a method of improving the plant health by application of a synergistic herbicidal combination.

Another object of the present invention is to provide a synergistic herbicidal combination comprising saflufenacil wherein the weed control efficacy of saflufenacil does not reduce with continued usage.

Another object of the present invention is to provide a synergistic herbicidal combination comprising saflufenacil wherein the weed control efficacy of saflufenacil does not reduce for at least 30 days after treatment.

Another object of the present invention is to provide a synergistic herbicidal combination which offers a broader and more complete spectrum of weed control.

Another object of the present invention is to provide a synergistic herbicidal combination which provides a better control of weeds at lower use rates, and which gives good residual control.

Another object of the present invention is to provide a synergistic herbicidal combination which is synergistic and thus helps in resistance management.

Some or all these and other objects of the invention can be achieved by way of the invention described hereinafter.

SUMMARY OF THE INVENTION

A herbicidal combination comprising (a) saflufenacil; (b) an organophosphorus herbicide selected from amiprofos-methyl, amiprophos, anilofos, bensulide, bilanafos, butamifos, clacyfos, 2,4-DEP, DMPA, EBEP, fosamine, glufosinate, glufosinate-P, glyphosate, huangcaoling, piperophos and shuangjiaancaolin; and (c) an arsenical herbicide selected from cacodylic acid, CMA, DSMA, hexaflurate, MAA, MAMA, MSMA, potassium arsenite and sodium arsenite.

A method of controlling weeds at a locus, the method comprising applying, to the locus, a combination comprising (a) saflufenacil; (b) an organophosphorus herbicide selected from amiprofos-methyl, amiprophos, anilofos, bensulide, bilanafos, butamifos, clacyfos, 2,4-DEP, DMPA, EBEP, fosamine, glufosinate, glufosinate-P, glyphosate, huangcaoling, piperophos and shuangjiaancaolin; and (c) an arsenical herbicide selected from cacodylic acid, CMA, DSMA, hexaflurate, MAA, MAMA, MSMA, potassium arsenite and sodium arsenite.

A composition comprising (a) saflufenacil; (b) an organophosphorus herbicide selected from amiprofos-methyl, amiprophos, anilofos, bensulide, bilanafos, butamifos, clacyfos, 2,4-DEP, DMPA, EBEP, fosamine, glufosinate, glufosinate-P, glyphosate, huangcaoling, piperophos and shuangjiaancaolin; (c) an arsenical herbicide selected from cacodylic acid, CMA, DSMA, hexaflurate, MAA, MAMA, MSMA, potassium arsenite and sodium arsenite; and (d) at least one agrochemically acceptable excipient.

A method of controlling weeds at a locus, said method comprising applying a composition comprising (a) saflufenacil; (b) an organophosphorus herbicide selected from amiprofos-methyl, amiprophos, anilofos, bensulide, bilanafos, butamifos, clacyfos, 2,4-DEP, DMPA, EBEP, fosamine, glufosinate, glufosinate-P, glyphosate, huangcaoling, piperophos and shuangjiaancaolin; (c) an arsenical herbicide selected from cacodylic acid, CMA, DSMA, hexaflurate, MAA, MAMA, MSMA, potassium arsenite and sodium arsenite; and (d) at least one agrochemically acceptable excipient.

DETAILED DESCRIPTION OF THE INVENTION

Surprisingly, it has been found by the present inventors that the combination of saflufenacil, an organophosphorus herbicide and an arsenical herbicide results in a synergistic control of undesirable plants at the locus of the desirable crop plants.

The inventors have surprisingly found that the arsenical herbicides, even when added to the combination of saflufenacil and the organophosphorus herbicides in minute quantities, resulted in an unexpected synergy. Without wishing to be bound by theory, it was found that the arsenical herbicides, even when added in minute quantities, surprisingly increased the efficacy of saflufenacil and the organophosphorus herbicide, causing a synergistic reaction. The resulting phytotoxicity usually seen when the organophosphorus herbicide and the arsenical herbicide were mixed was also absent.

It was further found that the gradual reduction in efficacy of saflufenacil, seen when either used alone or when used in combination with an organophosphorus herbicide for a continuous period of time, was reversed and the resulting efficacy at least reverted to the original level, or exceeded the original level, when the arsenical herbicide was added to the combination.

It was further surprising that this reversal in efficacy was seen even when the arsenical herbicide was used in otherwise non-effective amounts when used alone. However, this reversal in efficacy was more pronounced when the arsenical herbicide was used in conventional herbicidally effective amounts.

The term herbicide, as used herein, shall mean an active ingredient that kills, controls or otherwise adversely modifies the growth of plants. As used herein, a herbicidally effective or vegetation controlling amount is an amount of active ingredient that causes a "herbicidal effect," i.e., an adversely modifying effect and includes deviations from natural development, killing, regulation, desiccation, retardation. The terms "plants" and "vegetation" include, but are not limited to, germinant seeds, emerging seedlings, plants emerging from vegetative propagules, and established vegetation. The term "locus" as used herein shall denote the vicinity of a desired crop in which weed control, typically selective weed control is desired. The locus includes the vicinity of desired crop plants wherein the weed infestation has either emerged or is yet to emerge. The term crop shall include a multitude of desired crop plants or an individual crop plant growing at a locus.

An aspect of the present invention may be a herbicidal combination comprising (a) saflufenacil; (b) an organophosphorus herbicide selected from amiprofos-methyl, amiprophos, anilofos, bensulide, bilanafos, butamifos, clacyfos, 2,4-DEP, DMPA, EBEP, fosamine, glufosinate, glufosinate-P, glyphosate, huangcaoling, piperophos and shuangjiaancaolin; and (c) an arsenical herbicide selected from cacodylic acid, CMA, DSMA, hexaflurate, MAA, MAMA, MSMA, potassium arsenite and sodium arsenite.

Another aspect of the present invention may be a method of controlling weeds at a locus, the method comprising applying, to the locus, a combination comprising (a) saflufenacil; (b) an organophosphorus herbicide selected from amiprofos-methyl, amiprophos, anilofos, bensulide, bilanafos, butamifos, clacyfos, 2,4-DEP, DMPA, EBEP, fosamine, glufosinate, glufosinate-P, glyphosate, huangcaoling, piperophos and shuangjiaancaolin; and (c) an arsenical herbicide selected from cacodylic acid, CMA, DSMA, hexaflurate, MAA, MAMA, MSMA, potassium arsenite and sodium arsenite.

Another aspect of the present invention may be a composition comprising (a) saflufenacil; (b) an organophosphorus herbicide selected from amiprofos-methyl, amiprophos, anilofos, bensulide, bilanafos, butamifos, clacyfos, 2,4-DEP, DMPA, EBEP, fosamine, glufosinate, glufosinate-P, glyphosate, huangcaoling, piperophos and shuangjiaancaolin; (c) an arsenical herbicide selected from cacodylic acid, CMA, DSMA, hexaflurate, MAA, MAMA, MSMA, potassium arsenite and sodium arsenite; and (d) at least one agrochemically acceptable excipient.

Another aspect of the present invention may be a method of controlling weeds at a locus, said method comprising applying a composition comprising (a) saflufenacil; (b) an organophosphorus herbicide selected from amiprofos-methyl, amiprophos, anilofos, bensulide, bilanafos, butamifos, clacyfos, 2,4-DEP, DMPA, EBEP, fosamine, glufosinate, glufosinate-P, glyphosate, huangcaoling, piperophos and shuangjiaancaolin; (c) an arsenical herbicide selected from cacodylic acid, CMA, DSMA, hexaflurate, MAA, MAMA, MSMA, potassium arsenite and sodium arsenite; and (d) at least one agrochemically acceptable excipient.

Each of the aspect described above may have one or more embodiments.

In each of these embodiments, apart from saflufenacil, the embodiments may include the preferred organophosphorus herbicide and a preferred arsenical herbicide according to the present invention.

Each of the embodiments described hereinafter may apply to one or all of the aspects described hereinabove. These embodiments are intended to be read as being preferred features of one or all of the aspects described hereinabove. Each of the embodiments described hereinafter applies to each of the aspects described hereinabove individually.

In an embodiment, the present invention provides preferred combinations, compositions and methods thereof. The methods of the invention include a method of controlling weeds at a locus by applying to the locus the combination or the composition, or a method of increasing yield in a crop by application of the combination or composition, or a method of improving the plant health by application at the locus of the plant the combination or the composition. The embodiments described herein describe the preferred embodiments of all these possible combinations, compositions and methods of the invention.

Thus, an embodiment of the present invention may be a herbicidal combination comprising (a) saflufenacil; (b) an organophosphorus herbicide selected from glufosinate, glufosinate-P and glyphosate; and (c) an arsenical herbicide selected from cacodylic acid, CMA, DSMA, hexaflurate, MAA, MAMA, MSMA, potassium arsenite and sodium arsenite.

Another embodiment of the present invention may be a herbicidal combination comprising (a) saflufenacil; (b) glufosinate or a salt or ester thereof; and (c) an arsenical herbicide selected from cacodylic acid, CMA, DSMA, hexaflurate, MAA, MAMA, MSMA, potassium arsenite and sodium arsenite.

Another embodiment of the present invention may be a herbicidal combination comprising (a) saflufenacil; (b) glufosinate or a salt or ester thereof; and (c) MSMA.

Another embodiment of the present invention may be a herbicidal combination comprising (a) saflufenacil; (b) glufosinate-P or a salt or an ester thereof; and (c) an arsenical herbicide selected from cacodylic acid, CMA, DSMA, hexaflurate, MAA, MAMA, MSMA, potassium arsenite and sodium arsenite.

Another embodiment of the present invention may be a herbicidal combination comprising (a) saflufenacil; (b) glufosinate-P or a salt or an ester thereof; and (c) MSMA.

Another embodiment of the present invention may be a herbicidal combination comprising (a) saflufenacil; (b) glyphosate; and (c) an arsenical herbicide selected from cacodylic acid, CMA, DSMA, hexaflurate, MAA, MAMA, MSMA, potassium arsenite and sodium arsenite.

Another embodiment of the present invention may be a herbicidal combination comprising (a) saflufenacil; (b) glyphosate; and (c) MSMA.

The combination may be applied to the locus of the weeds in an herbicidally effective amount. The selection of the appropriate effective amounts depends on the density of weed infestation, weather patterns, crop health and many other factors, which may be made conveniently by a person skilled in the art. The effective amounts of these herbicides in the synergistic combination of the present invention is not particularly limiting.

In an embodiment, saflufenacil may be present in an amount from about 5 g/ha to about 500 g/ha.

In an embodiment, saflufenacil may be present in an amount from about 50 g/ha to about 150 g/ha.

In an embodiment, saflufenacil may be present in an amount of about 100 g/ha.

In an embodiment, saflufenacil may be present in an amount of about 200 g/ha.

In an embodiment, the organophosphorus herbicide glufosinate or glyphosate may be present in an amount of from about 100 g/ha to about 5000 g/ha.

In an embodiment, the arsenical herbicide MSMA may be used in an amount of from 1 to 10 lbs/acre, preferably in an amount of about 2 to 6 lbs/acre.

In an embodiment, the combination of the present invention may be combined with at least one other active ingredient selected from the group consisting of herbicides, insecticides, fungicides, biological agents, plant growth activators, fertilizers or combinations thereof.

Thus, in an embodiment, the combination of the present invention may be combined with a herbicide. Exemplary herbicides that may be combined with the combination of the present invention may be selected from, but not limited to, herbicides belonging to classes such as ACCase inhibitors, ALS inhibitors, EPSP synthase inhibitors, synthetic auxins, auxin transport inhibitors, glutamate synthase inhibitors, HPPD inhibitors, lipid synthesis inhibitors, long chain fatty acid inhibitors, as well as herbicides with unknown modes of action.

In an embodiment, the precise ratio of the three herbicides used may not be particularly limiting as it may be readily determined by skilled artisan for appropriate efficacy depending on, for example, the pest pressure, soil type, the weather, the formulation type and the standard dosage levels fixed by the regulatory authorities.

The dosage level of the individual herbicides may be defined by the inherent efficacy of the compound, the pest pressure, soil type, the weather, the formulation type, the defined MRL levels and many other indeterminate variables. These standard dosage levels are fixed by the regulatory authorities.

It was found that once it was realized that the present herbicidal combination was synergistic and/or has unexpected and/or surprising properties, it was easily possible to define a possible use rates for the individual herbicides in the combination depending on the weed pressure, the known efficacy, the regulatory approved dosage levels and the formulability of such herbicides.

Additionally, it was found that once a given ratio of these herbicides was identified as being synergistic, the selection of the precise quantities of the herbicides to be used in actual field conditions was straightforward to a skilled agronomist since the regulatorily approved quantities of these herbicides are well known to a skilled agronomist.

In an embodiment, the total amount of saflufenacil in the composition may typically be in the range of 0.1 to 99% by weight, preferably 0.2 to 90% by weight. The total amount of the organophosphorus herbicide in the composition may be in the range of 0.1 to 99% by weight. The total amount of the arsenical herbicide in the composition may be in the range of 0.1 to 10% by weight.

In an embodiment, the constituent herbicides of the combination of the present invention may be admixed in ratio of (1-80):(1-80):(1-10) of saflufenacil, the organophosphorus herbicide and the arsenical herbicide respectively.

In an aspect, the present invention may provide herbicidal combinations comprising saflufenacil, an organophosphorus herbicide, an arsenical herbicide and an herbicidal safener.

In an embodiment, the safener may be selected from benoxacor, BPCMS, cloquintocet, cyometrinil, cyprosulfamide, dichlormid, dicyclonon, dietholate, fenchlorazole, fenclorim, flurazole, fluxofenim, furilazole, isoxadifen, jiecaowan, Jiecaoxi, mefenpyr, mephenate, metcamifen, naphthalic anhydride, oxabetrinil and their salts and esters.

The herbicidal combination of the present invention maybe used to target weeds among the crops such corn, rice, wheat, barley, rye, oat, sorghum, cotton, soybean, peanut, buckwheat, beet, rapeseed, sunflower, sugar cane, tobacco, etc.; vegetables: solanaceous vegetables such as eggplant, tomato, pimento, pepper, potato, etc., cucurbit vegetables such as cucumber, pumpkin, zucchini, water melon, melon, squash, etc., cruciferous vegetables such as radish, white turnip, horseradish, kohlrabi, Chinese cabbage, cabbage, leaf mustard, broccoli, cauliflower, etc., asteraceous vegetables such as burdock, crown daisy, artichoke, lettuce, etc, liliaceous vegetables such as green onion, onion, garlic, and asparagus, ammiaceous vegetables such as carrot, parsley, celery, parsnip, etc., chenopodiaceous vegetables such as spinach, Swiss chard, etc., lamiaceous vegetables such as *Perilla frutescens*, mint, basil, etc, strawberry, sweet potato, *Dioscorea japonica, colocasia*, etc., flowers, foliage plants, turf grasses, fruits: pome fruits such apple, pear, quince, etc, stone fleshy fruits such as peach, plum, nectarine, *Prunus mume*, cherry fruit, apricot, prune, etc., citrus fruits such as orange, lemon, rime, grapefruit, etc., nuts such as chestnuts, walnuts, hazelnuts, almond, pistachio, cashew nuts, macadamia nuts, etc. berries such as blueberry, cranberry, blackberry, raspberry, etc., vines, kaki fruit, olive, plum, banana, oil palm, coffee, date palm, coconuts, etc., trees other than fruit trees; tea, mulberry, flowering plant, trees such as ash, birch, dogwood, *Eucalyptus, Ginkgo biloba*, lilac, maple, *Quercus*, poplar, Judas tree, *Liquidambar formosana*, plane tree, *zelkova*, Japanese arborvitae, fir wood, hemlock, juniper, *Pinus, Picea*, and *Taxus cuspidate*, etc.

Thus, in another aspect, the present invention provides a method of controlling weeds at a locus, the method comprising applying a combination comprising saflufenacil, the organophosphorus herbicide and the arsenical herbicide to the locus.

Thus, embodiments of the present invention may provide a method of controlling weeds at a locus, said method comprising application of synergistic combination of saflufenacil, the organophosphorus herbicide and the arsenical herbicide and optionally a fourth active ingredient.

In an embodiment, the fourth active ingredient may selected from herbicide, insecticide, fungicide, biological agent, plant growth activator, fertilizers and combinations thereof.

The target weeds may be selected from:

Urticaceae weeds: *Urtica urens*

Polygonaceae weeds: *Polygonum convolvulus, Polygonum lapathifolium, Polygonum pensylvanicum, Polygonum persicaria, Polygonum longisetum, Polygonum aviculare, Polygonum arenastrum, Polygonum cuspidatum, Rumex japonicus, Rumex crispus, Rumex obtusifolius, Rumex acetosa;*

Portulacaceae weeds: *Portulaca oleracea;*

Caryophyllaceae weeds: *Stellaria media, Cerastium holosteoides, Cerastium glomeratum, Spergula arvensis, Silene gallica*

Molluginaceae weeds: *Mollugo verticillata;*

Chenopodiaceae weeds: *Chenopodium album, Chenopodium ambrosioides, Kochia scoparia, Salsola kali, Atriplex* spp.;

Amaranthaceae weeds: *Amaranthus retroflexus, Amaranthus viridis, Amaranthus lividus, Amaranthus spinosus, Amaranthus hybridus, Amaranthus palmeri, Amaranthus rudis, Amaranthus patulus, Amaranthus tuberculatos, Amaranthus blitoides, Amaranthus deflexus, Amaranthus quitensis, Alternanthera philoxeroides, Alternanthera sessilis, Alternanthera tenella;*

Papaveraceae weeds: *Papaver rhoeas, Argemone mexicana;*

Brassicaceae weeds: *Raphanus raphanistrum, Raphanus sativus, Sinapis arvensis, Capsella bursa-pastoris,*

*Brassica juncea, Brassica campestris, Descurainia pinnata, Rorippa islandica, Rorippa sylvestris, Thlaspi arvense, Myagrum rugosum, Lepidium virginicum, Coronopus didymus;*

Capparaceae weeds: *Cleome affinis;*

Fabaceae weeds: *Aeschynomene indica, Aeschynomene rudis, Sesbania exaltata, Cassia obtusifolia, Cassia occidentalis, Desmodium tortuosum, Desmodium adscendens, Trifolium repens, Pueraria lobata, Vicia angustifolia, Indigofera hirsuta, Indigofera truxillensis, Vigna sinensis;*

Oxalidaceae weeds: *Oxalis corniculata, Oxalis strica, Oxalis oxyptera;*

Geraniaceae weeds: *Geranium carolinense, Erodium cicutarium;*

Euphorbiaceae weeds: *Euphorbia helioscopia, Euphorbia maculate, Euphorbia humistrata, Euphorbia esula, Euphorbia heterophylla, Euphorbia brasiliensis, Acalypha australis, Croton glandulosus, Croton lobatus, Phyllanthus corcovadensis, Ricinus communis;*

Malvaceae weeds: *Abutilon theophrasti, Sida rhombifolia, Sida cordifolia, Sida spinosa, Sida glaziovii, Sida santaremnensis, Hibiscus trionum, Anoda cristata, Malvastrum coromandelianum*

Sterculiaceae weeds: *Waltheria indica;* Violaceae weeds: *Viola arvensis, Viola tricolor;*

Cucurbitaceae weeds: *Sicyos angulatus, Echinocystis lobata, Momordica charantia;*

Lythraceae weeds: *Lythrum salicaria;*

Apiaceae weeds: *Hydrocotyle sibthorpioides;*

Sapindaceae weeds: *Cardiospermum halicacabum;*

Primulaceae weeds: *Anagallis arvensis;*

Asclepiadaceae weeds: *Asclepias syriaca, Ampelamus albidus;*

Rubiaceae weeds: *Galium aparine, Galium spurium* var. *echinospermon, Spermacoce latifolia, Richardia brasiliensis, Borreria alata;*

Convolvulaceae weeds: *Ipomoea nil, Ipomoea hederacea, Ipomoea purpurea, Ipomoea hederacea* var. *integriuscula, Ipomoea lacunosa, Ipomoea triloba, Ipomoea acuminata, Ipomoea hederifolia, Ipomoea coccinea, Ipomoea quamoclit, Ipomoea grandifolia, Ipomoea aristolochiafolia, Ipomoea cairica, Convolvulus arvensis, Calystegia hederacea, Calystegia japonica, Merremia hedeacea, Merremia aegyptia, Merremia cissoides, Jacquemontia tamnifolia;*

Boraginaceae weeds: *Myosotis arvensis;*

Lamiaceae weeds: *Lamium purpureum, Lamium amplexicaule, Leonotis nepetaefolia, Hyptis suaveolens, Hyptis lophanta, Leonurus sibiricus, Stachys arvensis;*

Solanaceae weeds: *Datura stramonium, Solanum nigrum, Solanum americanum, Solanum ptycanthum, Solanum sarrachoides, Solanum rostratum, Solanum aculeatissimum, Solanum sisymbriifolium, Solanum carolinense, Physalis angulata, Physalis subglabrata, Nicandra physaloides;*

Scrophulariaceae weeds: *Veronica hederaefolia, Veronica persica, Veronica arvensis;*

Plantaginaceae weeds: *Plantago asiatica;*

Asteraceae weeds: *Xanthium pensylvanicum, Xanthium occidentale, Helianthus annuus, Matricaria chamomilla, Matricaria perforata, Chrysanthemum segetum, Matricaria matricarioides, Artemisia princeps, Artemisia vulgaris, Artemisia verlotorum, solidago altissima, Taraxacum officinale, Galinsoga ciliata, Galinsoga parviflora, Senecio vulgaris, Senecio brasiliensis, Senecio grisebachii, Conyza bonariensis, Conyza canadensis, Ambrosia artemisiaefolia, Ambrosia trifida, Bidens pilosa, Bidens frondosa, Bidens subalternans, Cirsium arvense, Cirsium vulgare, Silybum marianum, Carduus nutans, Lactuca serriola, Sonchus oleraceus, Sonchus asper, Wedelia glauca, Melampodium perfoliatum, Emilia sonchifolia, Tagetes minuta, Blainvillea latifolia, Tridax procumbens, Porophyllum ruderale, Acanthospermum australe, Acanthospermum hispidum, Cardiospermum halicacabum, Ageratum conyzoides, Eupatorium perfoliatum, Eclipta alba, Erechtites hieracifolia, Gamochaeta spicata, Gnaphalium spicatum, Jaegeria hirta, Parthenium hysterophorus, Siegesbeckia orientalis, Soliva sessilis;*

Liliaceae weeds: *Allium canadense, Allium vineale;*

Commelinaceae weeds: *Commelina communis, Commelina bengharensis, Commelina erecta;*

Poaceae weeds: *Echinochloa crus-galli, Setaria viridis, Setaria faberi, Setaria glauca, Setaria geniculata, Digitaria ciliaris, Digitaria sanguinalis, Digitaria horizontalis, Digitaria insularis, Eleusine indica, Poa annua, Alospecurus aequalis, Alopecurus myosuroides, Avena fatua, Sorghum halepense, Sorghum vulgare, Agropyron repens, Lolium multiflorum, Lolium perenne, Lolium rigidum, Bromus secalinus, Bromus tectorum, Hordeum jubatum, Aegilops cylindrica, Phalaris arundinacea, Phalaris minor, Apera spicaventi, Panicum dichotomiflorum, Panicum texanum, Panicum maximum, Brachiaria platyphylla, Brachiaria ruziziensis, Brachiaria plantaginea, Brachiaria decumbens, Brachiaria brizantha, Brachiaria humidicola, Cenchrus echinatus, Cenchrus pauciflorus, Eriochloa villosa, Pennisetum setosum, Chloris gayana, Eragrostis pilosa, Rhynchelitrum repens, Dactyloctenium aegyptium, Ischaemum rugosum, Oryza sativa, Paspalum notatum, Paspalum maritimum, Pennisetum clandestinum, Pennisetum setosum, Rottboellia cochinchinensis;*

Cyperaceae weeds: *Cyperus microiria, Cyperus iria, Cyperus odoratus, Cyperus rotundus, Cyperus esculentus, Kyllinga gracillima*

Equisetaceae weeds: *Equisetum arvense, Equisetum palustre,* and the like.

In an embodiment, the individual components of the combination of the present invention may be applied to the locus either simultaneously or sequentially, such that saflufenacil, the organophosphorus herbicide and the arsenical herbicide may be applied in a tank mix or as a pre-mixed composition.

In an embodiment, combination of the present invention may be applied either pre or post emergent. The advantage of the combination is surprisingly good residual effects, when applied in pre-emergent as well as quick knockdown when applied post emergent leading to quick control of weeds.

The method of control of the present invention may be carried out by spraying the suggested tank mixes, or the individual herbicides may be formulated as a kit-of-parts containing various components that may be mixed as instructed prior to spraying.

In an embodiment the components of the present invention may be packaged such that saflufenacil, the organophosphorus herbicide and the arsenical herbicide may be packaged separately and then tank mixed before the spraying.

In another embodiment the components of the present invention may be packaged such that saflufenacil, the organophosphorus herbicide and the arsenical herbicide may be packaged separately, whereas other additives are packaged separately, such that the two maybe tank mixed at the time of spraying.

In another embodiment the components of the present invention may be packaged as composition such that the organophosphorus herbicide and the arsenical herbicide are formulated into one composition and other additives are packaged separately, such that the two maybe tank mixed at the time of spraying.

Therefore, in another aspect, the present invention provides a composition comprising saflufenacil, the organophosphorus herbicide and the arsenical herbicide and at least one agrochemically acceptable excipient.

In an embodiment, the composition of the present invention may contain agriculturally acceptable adjuvants, carriers, diluents, emulsifiers, fillers, anti-foaming agents, thickening agents, anti-freezing agents, freezing agents etc. The compositions may be either solid or liquids. They can be solids, such as, for example, dusts, granules, water-dispersible granules, microcapsules or wettable powders, or liquids, such as, for example, emulsifiable concentrates, solutions, emulsions or suspensions, ZC formulations. They can also be provided as a pre-mix or tank mixes.

Suitable agricultural adjuvants and carriers may include, but are not limited to, crop oil concentrates; methylated seed oils, emulsified methylated seed oil, nonylphenol ethoxylate; benzylcocoalkyldimethyl quaternary ammonium salt; blend of petroleum hydrocarbon, alkyl esters, organic acid, and anionic surfactant; $C_9$-$C_{11}$ alkylpolyglycoside; phosphated alcohol ethoxylate; natural primary alcohol ($C_{12}$-$C_{16}$) ethoxylate; di-sec-butylphenol EO-PO block copolymer; polysiloxane-methyl cap; nonylphenol ethoxylate, urea ammonium nitrate; tridecyl alcohol (synthetic) ethoxylate (8EO); tallow amine ethoxylate; PEG(400) dioleate-99, alkyl sulfates, such as diethanolammonium lauryl sulfate; alkylarylsulfonate salts, such as calcium dodecylbenzenesulfonate; alkylphenol-alkylene oxide addition products, such as nonylphenol-$C_{18}$ ethoxylate; alcohol-alkylene oxide addition products, such as tridecyl alcohol-$C_{16}$ ethoxylate; soaps, such as sodium stearate; alkyl-naphthalene-sulfonate salts, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryl trimethylammonium chloride; polyethylene glycol esters of fatty acids, such as polyethylene glycol stearate; block copolymers of ethylene oxide and propylene oxide; salts of mono and dialkyl phosphate esters; vegetable or seed oils such as soybean oil, rapeseed/canola oil, olive oil, castor oil, sunflower seed oil, coconut oil, corn oil, cottonseed oil, linseed oil, palm oil, peanut oil, safflower oil, sesame oil, tung oil and the like; and esters of the above vegetable oils, and in certain embodiments, methyl esters.

Suitable liquid carriers that may be employed in a composition of the present invention may include water or organic solvents. The organic solvents include, but are not limited to, petroleum fractions or hydrocarbons such as mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids and the like. Organic solvents include, but are not limited to toluene, xylene, petroleum naphtha, crop oil, acetone, methyl ethyl ketone, cyclohexanone, trichloroethylene, perchloroethylene, ethyl acetate, amyl acetate, butyl acetate, propylene glycol monomethyl ether and diethylene glycol monomethyl ether, methyl alcohol, ethyl alcohol, isopropyl alcohol, amyl alcohol, ethylene glycol, propylene glycol, glycerine, N-methyl-2-pyrrolidinone, N,N-dimethyl alkylamides, dimethyl sulfoxide.

Solid carriers that may be employed in the compositions of the present invention may include but are not limited to attapulgite, pyrophyllite clay, silica, kaolin clay, kieselguhr, chalk, diatomaceous earth, lime, calcium carbonate, bentonite clay, Fuller's earth, talc, cottonseed hulls, wheat flour, soybean flour, pumice, wood flour, walnut shell flour, lignin, cellulose etc.

Thus, in another aspect, the present invention provides a method of controlling weeds at a locus, said method comprising applying a composition comprising saflufenacil, the organophosphorus herbicide and the arsenical herbicide and at least one agrochemically acceptable excipient.

Surprisingly, it has been found by the present inventors that saflufenacil, the organophosphorus herbicide and the arsenical herbicide, when applied individually, was ineffective in the control of weeds, but demonstrated excellent synergistic control on weeds when applied together. The combination controlled the weed both pre and post emergently. The combination of saflufenacil, the organophosphorus herbicide and the arsenical herbicide synergistically controlled broadleaf weeds, sedges, and grasses a particular locus. The current invention therefore provides advantageous methods of controlling weeds both pre and post emergently. The present method also provides a broader spectrum of controlling weeds that helps in resistance management, thus preventing the weed from becoming resistant to either of the herbicides whist providing a broader spectrum of control at lower use rates.

EXAMPLES

Trials were carried out for evaluating the herbicidal mixtures of the invention on different weeds. The percentage coverage of each weed at time t=0 and the time t=T was noted, and the percentage control was calculated from the observed percent weed coverage data. In this trial, time T was 19 days after application of the tested herbicides. The final values reported were the average of five (5) repetitions. The tested herbicides were sourced from the formulations readily available i.e. saflufenacil 70% WG, glufosinate-ammonium 28% SL and MSMA 480 SL. The results were tabulated as hereunder:

| | Dose | *Rotboellia* sp | *Z. grama* |
|---|---|---|---|
| Treatment | Dosage | Observed efficacy | Observed efficacy |
| Untreated check | — | 0.00 | 0.00 |
| Manual weeding | — | 0.00 | 0.00 |

| Treatment | Dose Dosage | *Rotboellia* sp Observed efficacy | *Z. grama* Observed efficacy |
|---|---|---|---|
| Glufosinate-Ammonium 28% SL | 1000 mL/ha | 45 | 55 |
| Saflufenacil 70% WG + Glufosinate ammonium 28% SL | 60 g/ha + 1500 mL/ha | 70 | 60 |
| Saflufenacil 70% WG + Glufosinate ammonium 28% SL + MSMA 480 SL | 70 g/ha + 2000 mL/ha + 5000 mL/ha | 93.0 | 96.0 |
| Saflufenacil 70% WG + Glufosinate ammonium 28% SL + MSMA 480 SL | 60 g/ha + 1500 mL/ha + 4000 mL/ha | 100.0 | 100.0 |
| Saflufenacil 70% WG + Glufosinate ammonium 28% SL + MSMA 480 SL | 50 g/ha + 1000 mL/ha + 3000 mL/ha | 100.0 | 100.0 |

It was thus found that the addition of saflufenacil to glufosinate helped to enhance the efficacy of glufosinate to some extent. However, the efficacy of the resulting combination was still not satisfactory. The addition of MSMA to the combination surprisingly enhanced the efficacy to about 100% weed control.

The invention claimed is:

1. A herbicidal combination comprising active ingredients consisting of:
   (a) saflufenacil in an amount from 5 g/ha to 500 g/ha;
   (b) glufosinate or glufosinate-P in an amount from 100 g/ha to 5000 g/ha; and
   (c) monosodium methyl arsonate (MSMA) in an amount from 2000 to 6000 g/ha.

2. A method of controlling weeds at a locus, the method comprising applying, to the locus the combination of claim 1.

3. A composition comprising the combination of claim 1 and (d) at least one agrochemically acceptable excipient.

4. A method of controlling weeds at a locus, said method comprising applying the composition of claim 3.

5. An agrochemical kit-of-parts comprising active ingredients consisting of:
   (a) saflufenacil in an amount from 5 g/ha to 500 g/ha;
   (b) glufosinate, or glufosinate-P in an amount from 100 q/ha to 5000 g/ha; and
   (c) monosodium methyl arsonate (MSMA) in an amount from 2000 to 6000 g/ha.

6. The combination of claim 1, wherein
   (a) the saflufenacil is present in an amount of 0.2 to 90% by weight of the combination;
   (b) the glufosinate or glufosinate-P is present in an amount of 0.1 to 99% by weight of the combination; and
   (c) the MSMA is present in an amount of 0.1 to 10% by weight of the combination.

* * * * *